(12) United States Patent
Komulainen et al.

(10) Patent No.: US 8,553,432 B2
(45) Date of Patent: Oct. 8, 2013

(54) POWER TRANSMISSION METHOD AND POWER TRANSMISSION APPARATUS

(75) Inventors: Risto Komulainen, Klaukkala (FI); Hannu Sarén, Tampere (FI)

(73) Assignee: Vacon OYJ, Vaasa (FI)

( * ) Notice: Subject to any disclaimer, the term of this patent is extended or adjusted under 35 U.S.C. 154(b) by 455 days.

(21) Appl. No.: 12/825,619

(22) Filed: Jun. 29, 2010

(65) Prior Publication Data

US 2010/0327793 A1 Dec. 30, 2010

(30) Foreign Application Priority Data

Jun. 30, 2009 (FI) ..................................... 20095736

(51) Int. Cl.
*H02J 3/36* (2006.01)

(52) U.S. Cl.
USPC ........ 363/35; 363/5; 363/65; 363/71; 363/77; 363/174; 318/599; 318/800; 318/801; 318/811; 320/121; 320/140; 361/434

(58) Field of Classification Search
USPC ................. 318/599, 811, 800, 801, 656, 658, 318/42, 123; 388/811, 819; 363/5, 17, 19, 363/21.1, 34, 35, 40, 95, 65, 71, 77, 150, 363/174, 175; 320/121, 140, 141, 142; 361/434
See application file for complete search history.

(56) References Cited

U.S. PATENT DOCUMENTS

| | | | |
|---|---|---|---|
| 5,625,545 A | | 4/1997 | Hammond |
| 5,682,303 A | * | 10/1997 | Goad .............................. 363/71 |
| 5,986,909 A | * | 11/1999 | Hammond et al. ............. 363/65 |
| 6,014,323 A | * | 1/2000 | Aiello et al. ..................... 363/71 |
| 6,236,580 B1 | * | 5/2001 | Aiello et al. ..................... 363/37 |
| 6,301,130 B1 | * | 10/2001 | Aiello et al. ..................... 363/37 |
| 6,762,947 B2 | * | 7/2004 | Hammond ....................... 363/35 |
| 7,471,532 B1 | | 12/2008 | Salama et al. |
| 7,710,093 B2 | * | 5/2010 | Dwarakanath et al. ........ 323/282 |
| 8,093,764 B2 | * | 1/2012 | Hammond ..................... 307/140 |
| 2003/0043603 A1 | | 3/2003 | Schreiber |

FOREIGN PATENT DOCUMENTS

EP  1657809 A1  5/2006

OTHER PUBLICATIONS

Song et al., "Cascaded Multilevel Inverter Employing Three-Phase Transformers and Single DC Input", IEEE Transactions on Industrial Electronics, vol. 56, No. 6, pp. 2005-2014, Jun. 2009.

Erik Persson, "Transient Effects in Application of PWM Inverters to Induction Motors", IEEE Transactions on Industry Applications, vol. 28, No. 5, Sep.-Oct. 1992, pp. 1095-1101.

(Continued)

*Primary Examiner* — Antony M Paul
(74) *Attorney, Agent, or Firm* — Birch, Stewart, Kolasch & Birch, LLP (57) ABSTRACT

Method and apparatus for controlling an apparatus transmitting power between two electricity networks or between an electricity network and a polyphase electric machine), and including low-voltage power cells (C), which include a single-phase input/output connection (IN/OUT). The power cells are arranged into groups ($G_1$-$G_N$, $G_{P1}$-$G_{PN1}$, $G_{S1}$-$G_{SN2}$, $G_1'''$-$G_N'''$) such that at least one power cell per each phase of the electricity network or of the electric machine belongs to each group, and the input terminals (IN) of all the power cells belonging to the same group are connected to a common transformer, the transformer including its own separate winding that is galvanically isolated. The controllable power semiconductor switches connected to the input connectors (IN) of all the power cells supplying power to the same transformer are controlled cophasally with a 50% pulse ratio.

15 Claims, 6 Drawing Sheets

(56) References Cited

OTHER PUBLICATIONS

Lezana et al., "Novel Cell Based on Reduced Single-Phase Active Front End for Multicell Converters", Industrial Electronics Society, 31st Annual Conference of IEEE, Nov. 6, 2005, pp. 733-738.
Rodriguez et al., "High-Voltage Multilevel Converter With Regeneration Capability", IEEE Transactions on Industrial Electronics, vol. 49, No. 4, Aug. 2002, pp. 839-846.
Sommer et al., "New Medium Voltage Drive Systems Using Three-Level Neutral Point Clamped Inverter with High Voltage IGBT", Industry Applications Conference, 1999, 34th IAS Annual Meeting, Conference Record of the 1999 IEEE, pp. 1513-1519.
Wrede et al., "Design of an Electronic Power Transformer," Proceedings of the IEEE Industrial Electronics Society, Sevilla, Spain, vol. 2, Nov. 5-8, 2002, pp. 1380-1385, XP010632907.

* cited by examiner

RELATED ART

Fig. 1

RELATED ART

Fig. 2A

RELATED ART

POWER TRANSMISSION METHOD AND POWER TRANSMISSION APPARATUS

FIELD OF TECHNOLOGY

The present invention relates to a method and an apparatus for transmitting power between a polyphase electric machine (motor or generator) that operates with alternating current (AC) and a power transmission network, which can be either a polyphase alternating-current (AC) network or a direct-current (DC) network. The invention can also be applied to power transmission between different networks, such as e.g. from a DC network to a polyphase AC network, or between AC networks of different voltages. More particularly, the invention relates to power transmission in a medium-voltage environment, in which both the electric machine and the power transmission network are medium-voltage.

PRIOR ART AND DESCRIPTION OF PROBLEM

A medium-voltage network refers to an electricity distribution network of over 1 kV that is used in the transmission of electrical energy e.g. between a high-voltage (over 36 kV) main grid and a low-voltage (below 1 kV) consumer network. Electricity distribution networks normally operate with 50/60 Hz alternating-current electricity, but there are also many medium-voltage or high-voltage direct-current networks in use, particularly with long transmission distances, and to connect networks of different frequencies to each other.

It is known in the art that it is advantageous to use a smaller current than medium-voltage in heavy-duty, such as over 1 MW, electric machines owing to the consequently smaller power losses. Often some kind of adjuster is needed between an electric machine and an electricity distribution network, owing to the different frequencies, the different voltage levels or the need for galvanic isolation. The adjustment needed can be arranged advantageously by means of a frequency converter and a transformer.

The voltage endurance of the switch-type power semiconductor components used in frequency converters is, for reasons of manufacturing technology, so small that with medium-voltage a number of them must be connected in series. For example, patent publication U.S. Pat. No. 7,471,532 discloses a solution wherein at least four power semiconductor switches connected in series are used per phase. An additional advantage of serial connection is that the pulse pattern of the output voltage comprises a number of steps between the extreme positive and extreme negative value which reduces any dangerous voltage exceedance produced in the insulations of the motor by the known reflection phenomenon that occurs with long cables (see e.g. Transient Effects in Application of PWM Inverters to Induction Motors/ E. Persson/IEEE Transactions of Industry Applications, vol. 28, no 5, September/October 1992).

A number of problems are attached to a serial circuit, such as e.g. the fact that the insulating strength of modular-type low-voltage power semiconductor switches (e.g. 1700 V voltage endurance) is not sufficient for medium voltages, for which reason awkward mechanical constructions that increase costs are needed for arranging adequate insulations.

The use of a so-called NPC (Neutral Point Clamped) circuit for implementing a medium-voltage frequency converter is also known in the art (see e.g. New Medium Voltage Drive Systems using Three-Level Neutral Point Clamped Inverter with High Voltage IGBT, R. Sommer et al, Industry Applications Conference 1999, Thirty-Fourth IAS Annual Meeting, Conference Record of the 1999 IEEE). In this type of circuit power components that possess a large voltage endurance, e.g. 4.5 kV, are used. These types of components are generally quite expensive owing, among other things, to the demanding manufacturing process and the small manufacturing quantities, which also increases the costs of apparatuses manufactured with this principle.

A generally used solution is also one in which a low-voltage, e.g. 690 V, frequency converter and transformers on both sides of it are used to adjust the voltage levels to a medium-voltage motor/generator and medium-voltage network. In this way generally-used, cost-effective and technically reliable low-voltage frequency converter technology can be utilized, but a drawback of the solution is the expensive transformers and also the high-amplitude voltage pulses on the medium-voltage side, which increase the stress imposed on the windings of the motor.

A so-called cascade circuit for utilizing low-voltage frequency converter technology with medium-voltages is known in the art, such a circuit is presented e.g. in patent publication U.S. Pat. No. 5,625,545. In a cascade circuit low-voltage power cells are used, which power cells are connected in series for each phase and with which, among other things, a multistep voltage pattern that imitates a sine wave and that is advantageous from the viewpoint of the voltage reflection phenomenon and filtering is formed, the frequency of which and the amplitude of the fundamental wave of which can be adjusted. Many variations of the circuit, which enable, among other things, the flowing of power in both directions, are known in the art. What the circuits have in common is that they are connected to a medium-voltage network with a transformer that comprises cell-specific secondary windings. Since the transformer operates at the frequency of the network, the size and costs of it are high, which is generally a problem in this system.

SUMMARY OF THE INVENTION

The aim of this invention is to achieve a new kind of method, with which the aforementioned drawbacks are avoided and with which a technically advantageous multistep voltage pattern is enabled in the connection of both an electric machine and an AC network (power transmission network). Owing to the multistep attribute, e.g. any necessary filtering of the voltage in the network interface requires fewer and smaller components, and is thus economically more advantageous than in prior-art solutions. Additionally, the system enables connection to an electrical circuit operating with DC voltage, such as to a power transmission line or to a power supply line.

The invention is suited to any voltage level of an electric machine or of a voltage network whatsoever, but it is particularly advantageous when either or both are medium-voltage. The invention can be applied to many types of power transmission, such as between an alternating-electricity network and an electric machine, between two alternating-electricity networks, between an alternating-electricity network and a direct-current network, or between a direct-current network and an electric machine.

In the basic concept according to the invention, a connection is made to both a three-phase electric machine circuit and to a three-phase alternating-electricity network with low-voltage single-phase power cells arranged according to the cascade principle, which power cells are connected to group-specific transformers that form galvanic isolation. At least one cell from each phase of an electric machine and of a network belongs to each power cell group. It is known in the art that the summed power of the three phases in a three-phase system can remain constant even though the phase-specific powers vary sinusoidally, owing to which fact the powers transmitted via transformers arranged according to the invention remain of essentially the same magnitude in all the groups. The circuits connected to the transformers operate at high frequency, e.g. over 1 kHz, as a consequence of which the transformers are small in size and inexpensive in terms of their costs.

An arbitrary amount of the groups formed from power cells and transformers can be connected in series in order to achieve a sufficient overall voltage level. The serial circuit also enables improvement of the fault tolerance of the system, e.g. such that if some power cell becomes damaged, all the group to which the damaged cell belongs is short-circuited, in which case the remaining groups can continue their operation. It is also possible to connect the power cells of the primary side or secondary side of these types of groups in parallel on the low-voltage side when either the electric machine or the power transmission network is low-voltage.

The invention is suited for use also between networks that are of different magnitudes in terms of their voltage levels, e.g. between an alternating-electricity network operating at medium-voltage and a low-voltage solar power plant. In this type of case all the power cells connected to the primary circuits of the group-specific transformers can be connected to the power transmission network with the cascade principle, and all the power cells connected to the secondary circuits of the transformers can be connected in parallel to the DC line to be supplied by the solar cells.

The power cells can be different, according to what type of network they are connected to. The power processing of cells connected to an AC network and to an electric machine preferably comprise two single-phase bridge circuits and a filter capacitor of DC voltage, whereas e.g. in unidirectional power transmission to a DC medium-voltage network just rectification and a filter capacitor of DC voltage are sufficient.

The invention enables the formation of alternating-voltage pattern that is technically advantageous, imitates a sine wave, and is adjustable in frequency, e.g. using low-voltage power cells on the medium-voltage electric machine and the medium-voltage alternating-electricity network sides. These types of power cells are based on the same technology that is generally used in low-voltage frequency converters that are widely used and are therefore inexpensive in cost and technically reliable. The core of the high-frequency transformer according to the invention can be manufactured advantageously e.g. from modern powder core materials or from very thin transformer plate. The windings of the transformer, for their part, can be implemented, depending on the number of turns, e.g. based on copper foil technology, aluminum foil technology or on so-called litz wire technology.

The characteristic features of the solution according to the invention are described in detail in the claims below.

SHORT DESCRIPTION OF THE DRAWINGS

In the following, the invention will be described in more detail by the aid some embodiments with reference to the attached drawings, wherein.

DETAILED DESCRIPTION OF THE INVENTION

Figure 1:
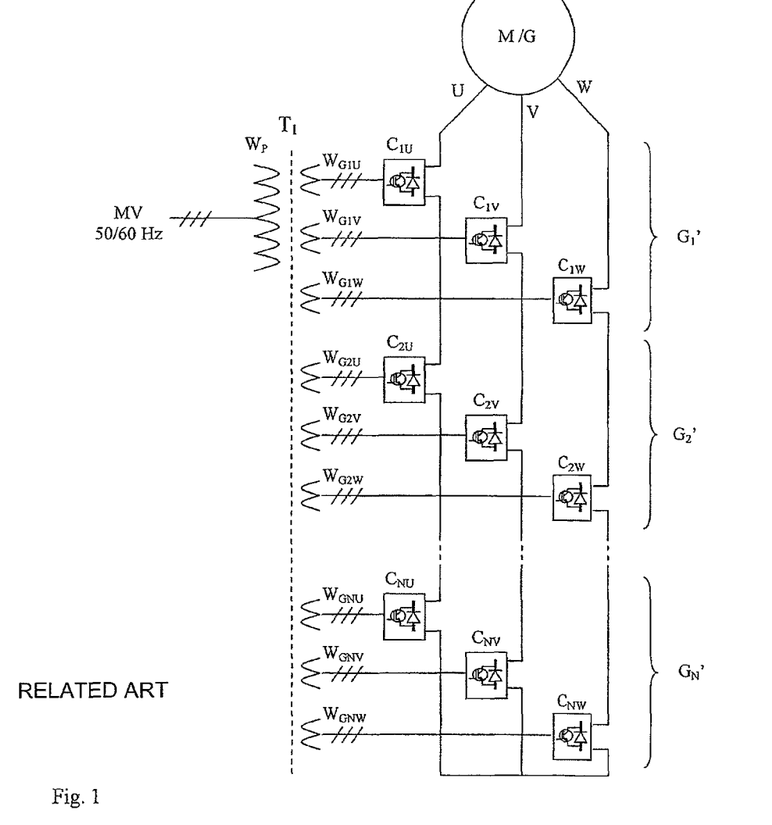
FIG. 1 presents a prior-art cascade circuit between an electric machine and a medium-voltage network.

FIG. 1 describes a prior-art basic circuit of a medium-voltage so-called cascade-connected frequency converter, the operation of which type of circuit is known from e.g. patent publication U.S. Pat. No. 5,625,545. It comprises both the medium-voltage supply voltage MV, the frequency of which is normally 50 Hz or 60 Hz, and the medium-voltage connection voltage of the electric machine M/G, which can be adjusted in frequency. The frequency converter comprises low-voltage power cells, many of which are connected in series in each phase U, V, W. The power cells are connected to a common transformer $T_1$, the 3-phase primary winding $W_P$ of which is connected to the supplying medium-voltage network MV, and which transformer comprises a separate 3-phase low-voltage secondary winding $W_{G1U}$-$W_{GNW}$ for each power cell. To reduce the harmonics produced in the supply network, the secondary voltages can be phase-shifted with regard to each other, e.g. such that the voltages of the winding group $W_{G1U}$-$W_{G1W}$ supplying the first power cell group $G_1'$, containing the power cells $C_{1U}$-$C_{1W}$, are phase-shifted with regard to the voltages of the winding group $W_{G2U}$-$W_{G2W}$ supplying the second power cell group $G_2'$, containing the power cells $C_{2U}$-$C_{2W}$, etc. An arbitrary amount of power cell groups $G_1'$-$G_N'$ can belong to a frequency converter. The more groups connected in series that are used, the more steps the pulse pattern of the output voltage can be comprised of, which has an advantageous effect on the harmonics content of the output voltage.

Figure 2A:
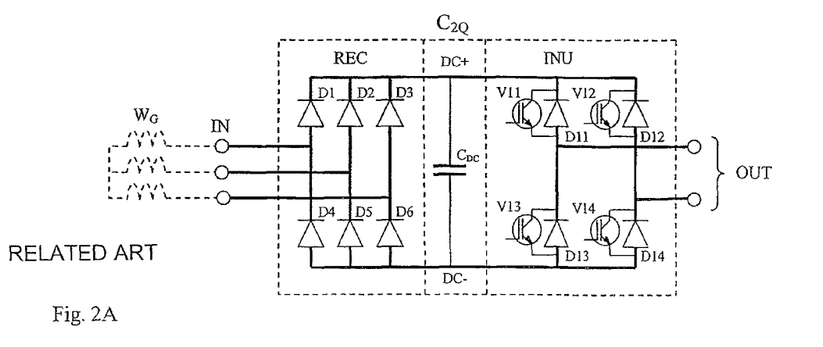
FIG. 2A presents the circuit of a prior-art power cell when the direction of the power is just from the network towards the motor.

FIG. 2A presents one possible internal circuit of a power cell $C_{2Q}$, of a type that it is known in the art can be used when the direction of flow of the power is just from the supply network towards the motor. The three-phase winding $W_G$ of the transformer, which winding is connected to the supply connectors IN, supplies the power cell. The power cell comprises a three-phase rectifying bridge REC comprised of diodes D1-D6, a DC filter capacitor $C_{DC}$ and also a single-phase inverting unit INU, which comprises two so-called phase switches, which can be connected to either pole whatsoever of an output connector OUT of either direct-current pole DC+, DC− whatsoever. The first phase switch comprises controllable power semiconductor switches, e.g. IGBTs V11, V13, and the so-called zero diodes D11, D13 connected in parallel with them and to a second phase switch V12, V14 and D12, D14.

Figure 2B:
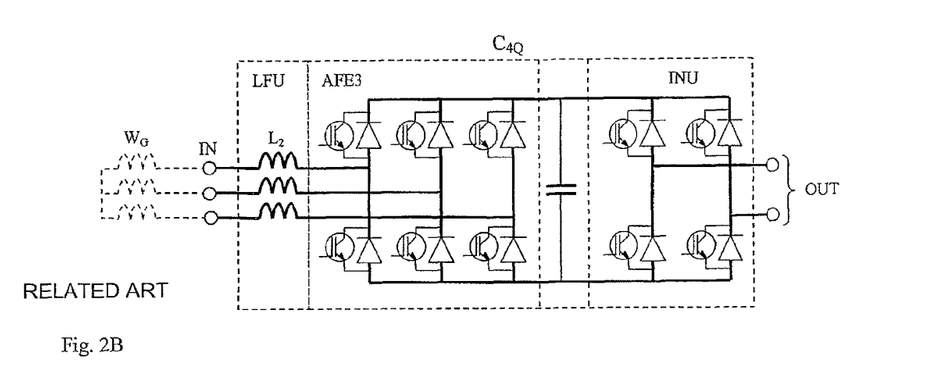
FIG. 2B presents the circuit of a prior-art power cell when the direction of the power is free.

When power can flow in either direction whatsoever, it is prior art to use a circuit $C_{4O}$ of a power cell according to FIG. 2B. In it an active bridge AFE3 is used in place of a rectifying bridge REC, which active bridge comprises three similar phase switches, which are also used in the inverting unit INU. A filter unit LFU can be connected between the secondary winding $W_G$ to be supplied and the AFE3 bridge, for damping the harmonics of the current. By using the AFE3 it is known in the art that apart from being able to supply braking power to the network, also an almost sinusoidal waveform of the network current can be achieved, owing to which a phase shift between the secondary windings of the transformer can be unnecessary.

Figure 3:
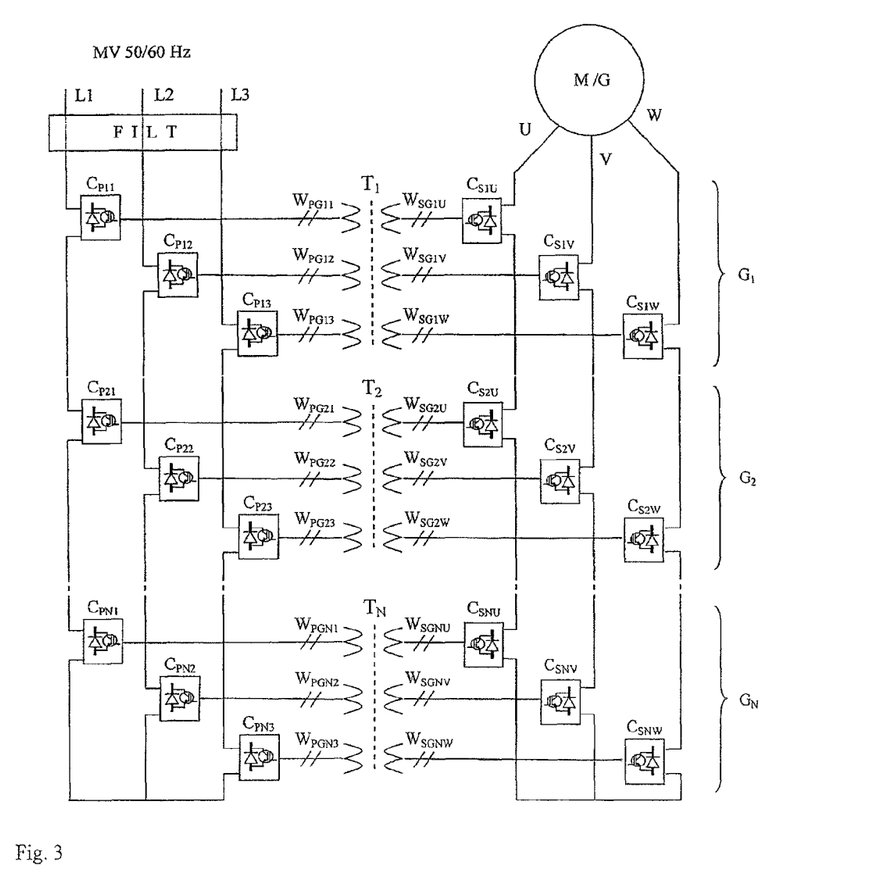
FIG. 3 presents a cascade circuit according to the invention between an electric machine and a medium-voltage network.

FIG. 3 presents a basic circuit of a medium-voltage frequency converter according to the current invention. It comprises low-voltage power cells connected in a cascade on both the medium-voltage network MV (frequency 50/60 Hz, phases L1, L2, L3) and the medium-voltage electric machine M/G (frequency adjustable, phases U, V, W) sides, and high-frequency transformers connect the power cells. The power cells and the transformers are arranged into groups, which comprise at least one power cell from each phase. For example, the group $G_1$ according to the figure includes the power cells $C_{P11}$-$C_{P13}$ on the supply network side, the transformer $T_1$ and the power cells $C_{S1U}$-$C_{S1W}$ on the electric machine side. The transformer comprises its own single-phase winding per each power cell, in this case the primary windings $W_{PG11}$-$W_{PG13}$ and the secondary windings t $W_{SG1U}$-$W_{SG1W}$. There are at least two such serially-connected groups $G_1$-$G_N$, but typically more, and a transformer can comprise an arbitrary amount of them according to the need for matching voltage levels or the needs to optimize the pulse patterns of the input voltages and the output voltages. The same group in the embodiment of the figure thus comprises at least 6 power cells, one from each phase on both sides of the transformer, but there can be more of them according to how the windings fit into the transformer. According to the basic concept of the invention, however, at least as many cells from each input phase, e.g. 2, and as many cells from each output phase, e.g. 1, must belong to a group, in which case in this embodiment the group comprises a total of 9 cells.

It is possible to apply the invention also when the nominal voltage levels of the supply network MV and of the electric machine M/G are of different magnitudes. Adjustment of the voltage levels can be handled e.g. by means of the number of turns of the primary windings and secondary windings of the transformers when it is desired to preserve the same multistep voltage pattern on both sides. More particularly when either side is low-voltage, it is also possible to connect in parallel all the power cells in question on the low-voltage side that belong to the same phase but to different groups. It is also possible to handle the matching of voltage levels with different magnitudes of the numbers of primary windings and secondary windings such that double the amount of windings and power cells compared to the embodiment of FIG. 3 are disposed on the primary side of the transformers, in which case the voltage level of the primary side can be fitted to be double with respect to the voltage level of the secondary side, using power cells of the same voltage.

In the embodiment of FIG. 3, the power cells are arranged in a star connection between the connections of the alternating-electricity network and the star point. It is obvious to the person skilled in the art that within the scope of the invention the power cells can just as well be connected also in a delta connection, in which case e.g. the power cell $C_{S1U}$-$C_{SNU}$ are connected between the phases U and V, the power cells $C_{S1V}$-$C_{SNV}$ are connected between the phases V and W, and the power cells $C_{S1W}$-$C_{SNW}$ are connected between the phases W and U.

The embodiment of FIG. 3 and later embodiments describe a normal 3-phase network and electric machine, but the invention does not place any limitations on the number of phases of the alternating-electricity networks on both sides of the transformer. According to the basic concept of the invention, both the AC networks are connected to a group-specific transformer with at least as many power cells as there are phases in the networks. Since the voltage formed by the frequency converter according to the invention is pulse-like, a filter FILT can be connected between it and the power transmission network MV for limiting the harmonics of the network current.

Figure 4A:
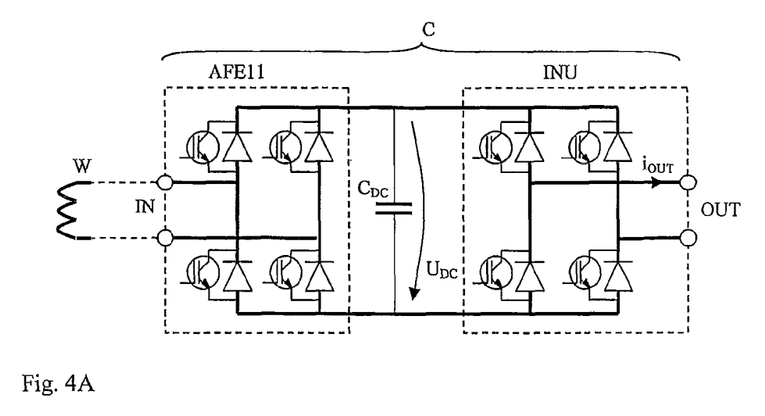
FIG. 4A presents the circuit of a power cell according to the invention.

FIG. 4A presents a basic circuit of a single-phase power cell C according to the invention. It comprises a single-phase bridge circuit AFE11 connected to a transformer, a filter capacitor $C_{DC}$ of the DC intermediate circuit and a single-phase inverter bridge INU. Both AFE11 and INU are comprised of phase switches that are formed from similar power semiconductor switches, the details if which are presented in connection with FIG. 2A above. According to the invention AFE11 operates continuously at a 50% pulse ratio such that the AFE bridges of all the power cells connected to the same transformer operate cophasally. As is obvious to a person skilled in the art, the power cell presented by FIG. 4A can transmit power in either direction, from the input connector IN to the output connector OUT or vice versa.

Figure 4B:
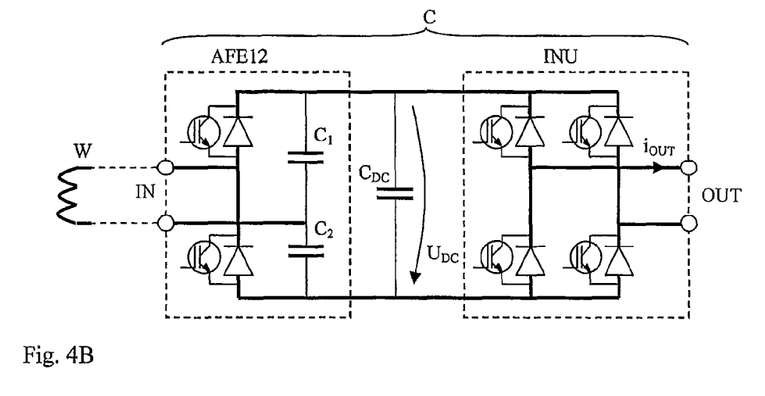
FIG. 4B presents a second circuit of a power cell according to the invention.

Since the AFE bridge operates at a 50% pulse ratio, there is a possibility known in the art of replacing the second phase switch of the bridge circuit with two capacitors $C_1$, $C_2$ in the manner presented by the bridge circuit AFE12 of FIG. 4B. The capacitors $C_1$, $C_2$ are dimensioned in this circuit according to the load current and the desired voltage range, as is known to a person skilled in the art.

It is obvious to the person skilled in the art that when the flow direction of the power is from the transformer towards the power cell, the current flows essentially only via the zero diodes, so that controlling the controllable power semiconductors of the AFE bridge circuit is not necessary or these components can be omitted completely from the AFE bridge circuits of FIGS. 4A and 4B.

When an individual power cell malfunctions, e.g. in a short-circuit of an IGBT, it can be necessary to isolate the group connected to the damaged power cell from the operation of the apparatus. This can be arranged by short-circuiting the output connectors (OUT) of all the power cells of the group, e.g. with contactors. The voltage of this group of course falls short of the voltage pattern formed by the whole apparatus, but in a system of sufficiently many steps this is not necessarily a drawback, in which case the apparatus can continue its operation.

Figure 5:
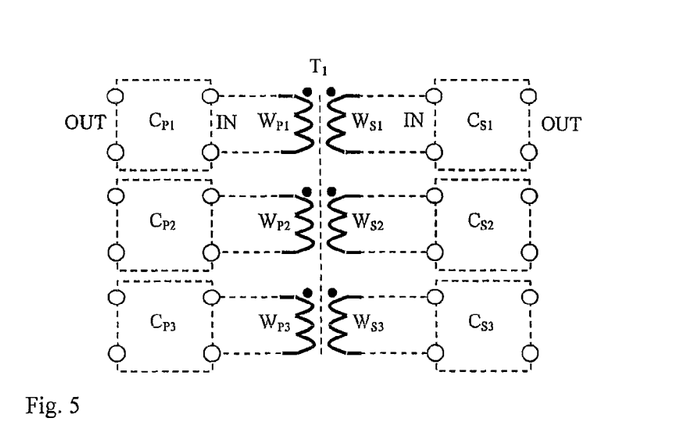
FIG. 5 presents the circuit of a group-specific transformer according to the invention.

FIG. 5 presents the basic circuit of a group-specific transformer $T_1$ according to the invention when the transformer comprises 3 windings $W_{P1}$-$W_{P3}$ of the input phase and 3 windings $W_{S1}$-$W_{S3}$ of the output phase. The winding directions of all the windings are the same, which small dots at one end of the windings so indicate. The numbers of turns of all the windings are the same, and since the flux of the same common core penetrates them, the voltages of the windings are also of essentially the same magnitudes and same phases. On the primary side and secondary side it is, of course, also possible to use different magnitudes of the numbers of turns e.g. when the nominal voltage levels of the motor/generator and of the supply network are of different magnitudes.

According to the invention the voltages of the poles IN of all the power cells $C_{P1}$-$C_{P3}$, $C_{S1}$-$C_{S3}$ connected to the same transformer are controlled to be the same phases. That being the case, if the voltage of filter capacitor $C_{DC}$ of the DC intermediate circuit of some power cell tries to rise higher than the voltages of the intermediate circuit of the other cells owing to the greater power supplied to the cell in question, the pole voltage in the IN connection of the power cell in question also rises higher than the others, in which case, of course, also the current supplied to the transformer increases (the stray inductances of the circuit limit current pulses caused by possible imprecisions of the timings of the control pulses of the power switches, for which purpose also an extra choke can be used between the transformer and the power cell). Thus the voltages of the intermediate circuit of all the power cells of a group remain essentially the same magnitudes even if the powers supplied to the transformer or taken from it were to vary. Also the power transmitted via a transformer remains essentially constant and proportional to the overall power of a motor/generator, because the same amount of power cells from each phase is connected to the same transformer and the summed power of a three-phase system is known to be essentially constant although the phase-specific powers change according to the sine wave. Possible transient exceptions to this level power rule, which exceptions can result from e.g. the operation of the INU blocks, are evened out by the filter capacitors of the intermediate circuit of the power cells, which capacitors function as energy storages.

Figure 6A:
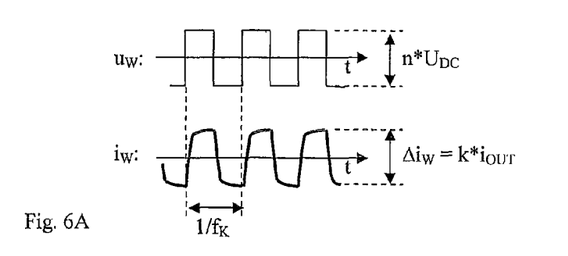
FIG. 6A presents a characteristic winding voltage and the current of one winding of a transformer according to the invention.
Figure 6B:
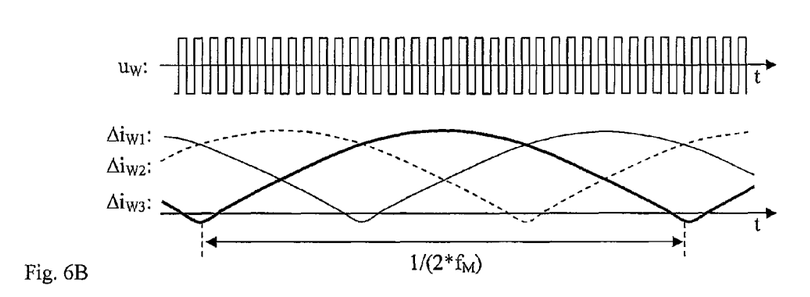
FIG. 6B presents a characteristic winding voltage and the amplitudes of the currents of three phases of a transformer according to the invention.

FIGS. 6A and 6B present the essential waveforms connected to power transmission as a function of time t. The wave $u_W$ describes the voltage of the windings of the transformer, the variation range of which when using a circuit according to FIG. 4B is the same as the voltage $U_{DC}$ of the filter capacitors of the intermediate circuits of the power cells and the voltage $2 \times U_{DC}$ in the circuit according to FIG. 4A. The essential form of the voltage pattern is rectangular, its pulse ratio is 50% and its frequency $f_k$ preferably very high, e.g. 10 kHz. The wave $i_W$ describes the current of the winding of the transformer, the variation range $\Delta i_W$ of which is proportional to the power to be transmitted, i.e., to the output current $i_{OUT}$ of the INU block. FIG. 6B illustrates the variation ranges $\Delta i_{W1}$, $\Delta i_{W2}$, and $\Delta i_{W3}$ of the winding currents of the power cells connected to three parallel phases, e.g. L1, L2, L3. The coil currents change proportionally to the power to be transmitted, essentially sinusoidally, at twice the frequency $2 \times f_M$ of the electric machine or of the supply network.

Figure 8:
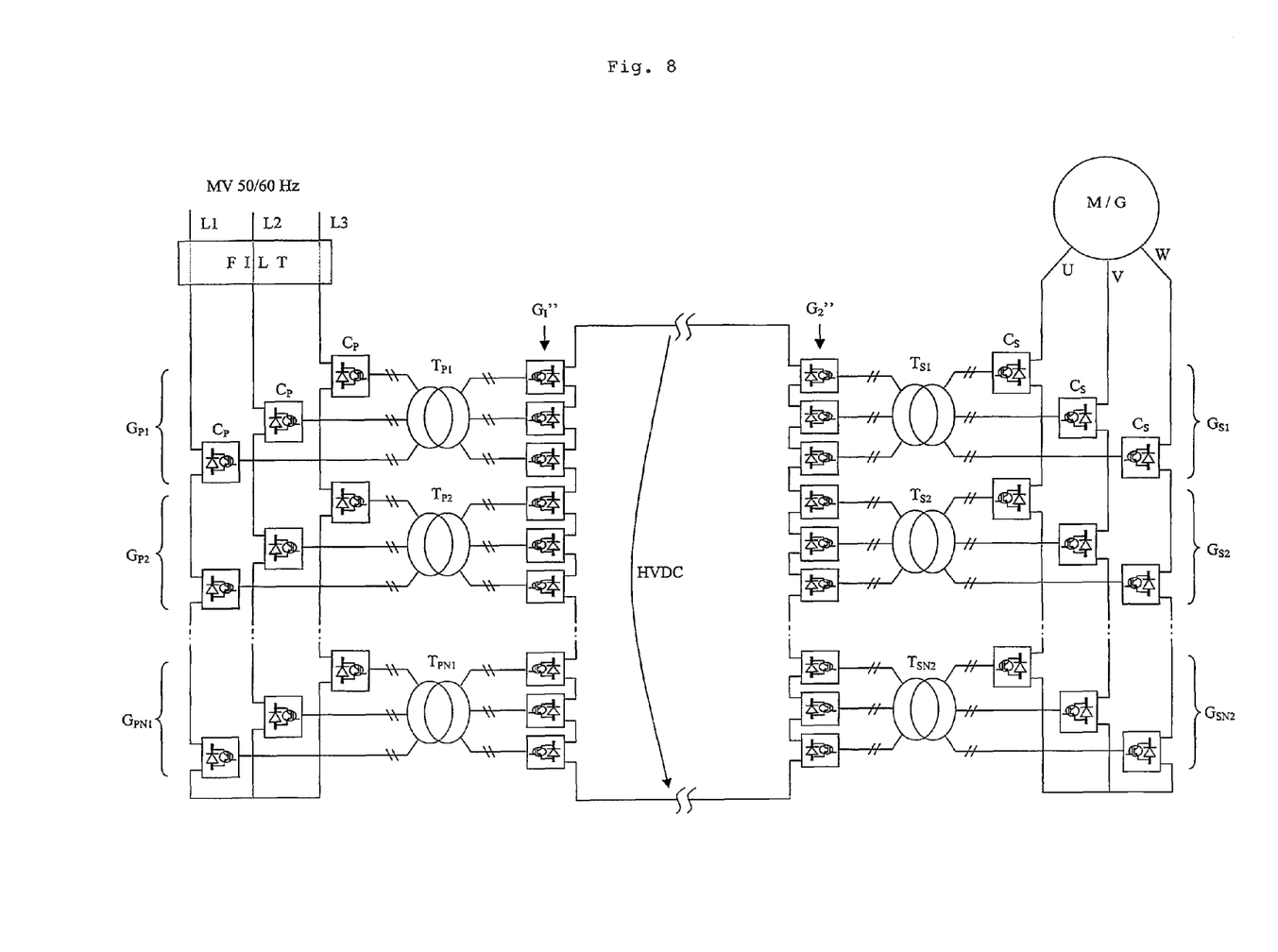
FIG. 8 presents a cascade circuit according to the invention between an electric machine and a medium-voltage network, when the power is transmitted via a DC power transmission link.

The invention can be applied, apart from in the direct frequency converter between the electric machine and the AC network according to FIG. 3, also when power is transmitted via a DC link. FIG. 8 presents a diagram of this type of solution. It comprises a voltage pattern connected to a medium-voltage network MV formed with power cell groups $G_{P1}$-$G_{PN1}$ arranged into a cascade circuit, the multistep voltage pattern formed by which power cell groups can be filtered with a filter FILT. The solutions earlier described in FIGS. 4A and 4B can be used as power cells $C_P$, and they are connected to the group-specific transformers $T_{P1}$-$T_{PN1}$ according to the basic concept of the invention.

Correspondingly, the voltage pattern connected to the electric machine M/G is formed with the power cell groups $G_{S1}$-$G_{SN2}$ according to the invention, which comprise the power cells $C_S$ (which can also be according to FIG. 4A or 4B) and the transformers $T_{S1}$-$T_{SN2}$. The numbers N1 and N2 of the groups can differ from each other.

Figure 7A:
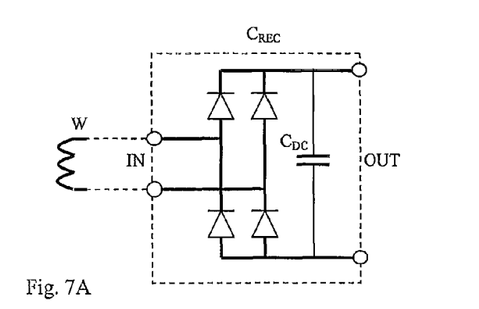
FIG. 7A presents the circuit of a power cell according to the invention when using DC power transmission.
Figure 7B:
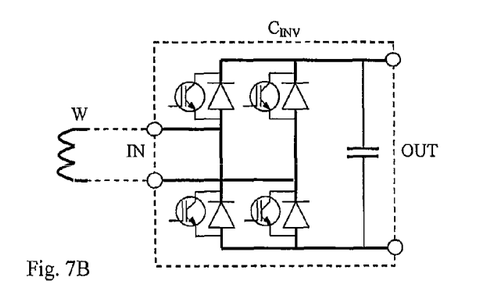
FIG. 7B presents a second circuit of a power cell according to the invention when using DC power transmission.

The secondary windings of the transformers on both the supply network side and the electric machine side are connected to the power cell groups $G_1"$, $G_2"$, both of which are comprised of a number of power cells connected in series, which power cells are according to either FIG. 7A or FIG. 7B. Both power cell groups $G_1"$, $G_2"$ are connected directly to the DC link HVDC. The number of power cells to be connected to the transformers on the DC link side does not need to be the same as the number of power cells to be connected on the alternating-current side, because owing to the fact that they are connected directly in series the same power always flows through all the power cells on the DC link side.

FIG. 7A presents a possible circuit of a power cell $C_{REC}$ disposed on the DC link side. This type of circuit can be used when power flows in only one direction, e.g. in the group $G_1"$ when power flows always from the network towards the motor, or in the group $G_2"$ when power flows always from the generator towards the network. The power cell $C_{REC}$ can in this case comprise just a rectifying bridge, consisting of single-phase diodes, and a filter capacitor $C_{DC}$.

When power is transmitted in both directions, and also in the preceding case of unidirectional power transmission on that side in which power is transmitted away from the DC link, the circuit $C_{INV}$ of the power cell presented in FIG. 7B can be used. The power cell is formed from two phase switches and filter capacitor of DC voltage. The phase switches are controlled with a 50% pulse ratio, in which case the power transmission operates as presented in the description of FIG. 5.

Figure 9:
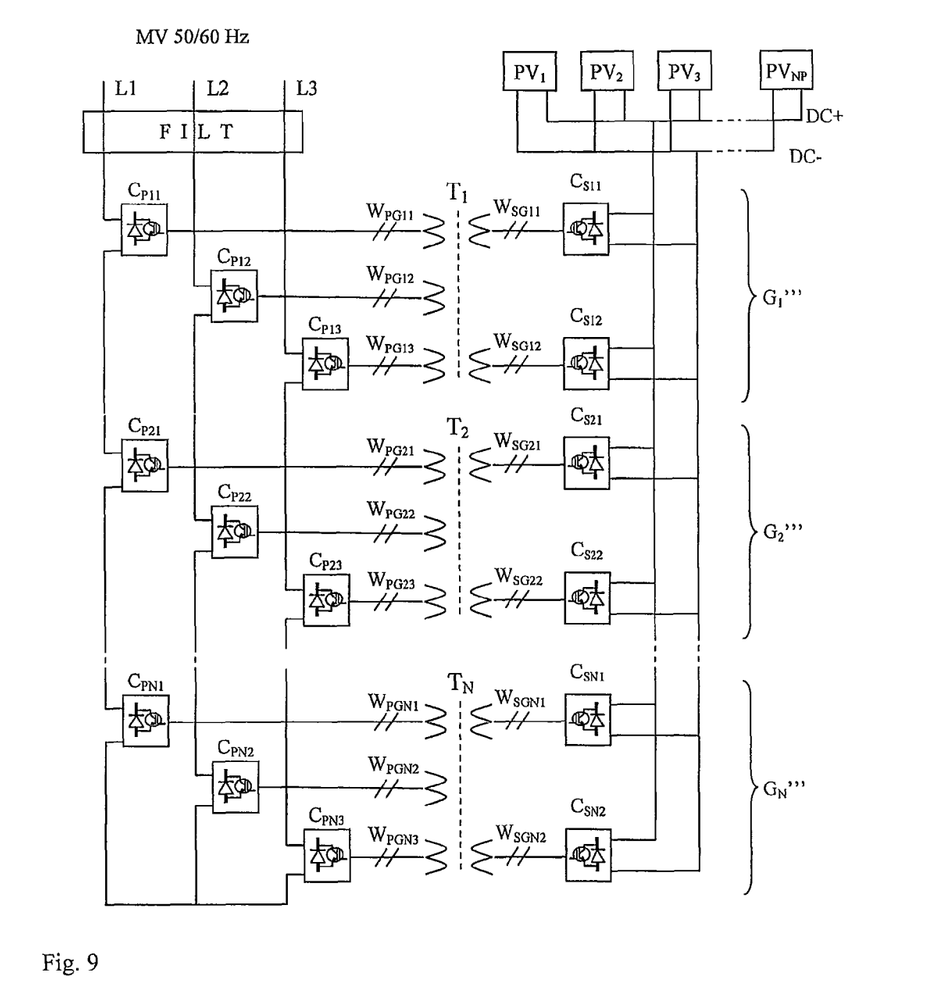
FIG. 9 presents a cascade circuit according to the invention between a solar cell power plant and a medium-voltage network.

FIG. 9 presents an embodiment of the application of the invention to a solar power plant. In it the solar cells or solar cell groups $PV_1$-$PV_{NP}$ supply power to the same low-voltage DC link (poles DC+, DC−) to which the groups $G_1'''$-$G_N'''$ comprised of power cells and transformers arranged according to the invention are connected. Owing to their low-voltage characteristic, all the power cells $CS_{11}$-$CS_{N2}$ connected to the DC link can be connected in parallel, nor are there any restrictions to the number of power cells to be connected to the same transformer. In the embodiment of FIG. 9, the number in question is 2, but if the component dimensioning of the power cell so permits, even one is sufficient. Since in this embodiment power is transmitted only in one direction, from the solar cells to the alternating-electricity network MV, the simple circuit of FIG. 7B can be used in the power cells $C_{S11}$-$C_{SN2}$ connected to the DC link, and controllable power semiconductor switches are not needed in the AFE bridge circuits of the power cells $C_{P11}$-$C_{PN3}$ (according to FIGS. 4A and 4B) connected to the alternating-electricity network, or they can be omitted completely.

It is obvious to the person skilled in the art that the different embodiments of the invention are not limited solely to the examples described above, but that they may be varied within the scope of the claims presented below. In the claims a direct-current network is understood to be a single-phase electricity network.

The invention claimed is:

1. An apparatus configured to transmit power between a first electricity network and a second electricity network, the first electricity network being either a single-phase DC-network or a polyphase AC-network, and the second electricity network being either a polyphase AC-network or a polyphase electric machine, the apparatus comprising:
   a plurality of low-voltage power cells arranged to connect the first electricity network to the second electricity network, wherein each low-voltage power cell of the plurality of low-voltage power cells includes a single-phase input connection (IN) and a single-phase output connection (OUT), wherein the plurality of low-voltage power cells are arranged into one or more groups, wherein each group of the one or more groups includes
at least one low-voltage power cell per each phase of the first electricity network,
at least one low-voltage power cell per each phase of the second electricity network,
controllable semiconductor switches connected to the input connections (IN) of each of the low-voltage power cells of the group, and
a group-specific transformer, wherein, inside each group of the one or more groups, a single-phase input connection (IN) of a first low-voltage power cell is connected to a first winding of the group-specific transformer, the first winding being galvanically isolated from other windings of the group-specific transformer that are connected to single-phase input connections (IN) of other low-voltage power cells of the corresponding group, and wherein, inside each group of the one or more groups, the controllable semiconductor switches are configured to be controlled so that voltage waveforms of all input connections (IN) of the corresponding group are cophasal with a 50% pulse ratio.

2. The apparatus of claim 1, further comprising:
a controller operatively connected to the controllable semiconductor switches and configured to control the controllable semiconductor switches so that the voltage waveforms of all of the input connections (IN) of the corresponding group are cophasal with the 50% pulse ratio.

3. The apparatus of claim 1, wherein the first electricity network is the single-phase DC-network.

4. The apparatus of claim 1, wherein the first electricity network is the polyphase AC-network.

5. The apparatus of claim 1, wherein the second electricity network is the polyphase AC-network.

6. The apparatus of claim 1, wherein the second electricity network is the polyphase electric machine.

7. The apparatus of claim 1, wherein the controllable semiconductor switches are configured to be controlled at a frequency of over 1 kHz.

8. The apparatus of claim 1, wherein each of the low-voltage power cells comprises:
a single phase bridge connected in parallel to a capacitor that is connected in parallel to a single phase inverter bridge,
wherein each single phase bridge is connected to a respective one of the galvanically separated windings, and
wherein each single phase inverter bridge is connected to a respective one of the first electricity network and the second electricity network.

9. The apparatus of claim 8,
wherein each single phase bridge comprises two serial diode controllable power semiconductor switches and corresponding diodes, and
wherein each single phase inverter bridge comprises two parallel sets of two diode controllable power semiconductor switches and corresponding diodes.

10. The apparatus of claim 8, wherein each single phase bridge comprises two parallel sets of two serial diode controllable power semiconductor switches and corresponding diodes.

11. The apparatus of claim 8, wherein each single phase bridge comprises two serial capacitors in parallel to the two serial diode controllable power semiconductor switches and corresponding diodes.

12. The apparatus of claim 1, wherein the one or more groups are arranged in one of a star pattern and a delta pattern.

13. The apparatus of claim 1, wherein each of the low-voltage power cells are configured to be controllably short-circuited.

14. A method of controllably transmitting power by an apparatus between a first electricity network and a second electricity network, the first electricity network being either a single-phase DC-network or a polyphase AC-network, and the second electricity network being either a polyphase AC-network or a polyphase electric machine, the apparatus comprising a plurality of low-voltage power cells arranged to connect the first electricity network to the second electricity network, wherein each low-voltage power cell of the plurality of low-voltage power cells includes a single-phase input connection (IN) and a single-phase output connection (OUT), wherein the plurality of low-voltage power cells are arranged into one or more groups, wherein each group of the one or more groups includes at least one low-voltage power cell per each phase of the first electricity network, at least one low-voltage power cell per each phase of the second electricity network, controllable semiconductor switches connected to the input connections (IN) of each of the low-voltage power cells of the group, and a group-specific transformer, wherein, inside each group of the one or more groups, a single-phase input connection (IN) of a first low-voltage power cell is connected to a first winding of the group-specific transformer, the first winding being galvanically isolated from other windings of the group-specific transformer that are connected to single-phase input connections (IN) of other low-voltage power cells of the corresponding group, the method comprising:
controlling, inside each group of the one or more groups, the controllable semiconductor switches so that voltage waveforms of all input connections (IN) of the corresponding group are cophasal with a 50% pulse ratio.

15. An apparatus configured to transmit power between a first electricity network and a second electricity network, the first electricity network being either a single-phase DC-network or a polyphase AC-network, and the second electricity network being either a polyphase AC-network or a polyphase electric machine, the apparatus comprising:
a plurality of low-voltage power cells arranged to connect the first electricity network to the second electricity network, wherein each low-voltage power cell of the plurality of low-voltage power cells includes a single-phase input connection (IN) and a single-phase output connection (OUT), wherein the plurality of low-voltage power cells are arranged into one or more groups; and
means for controlling the plurality of low-voltage power cells so that voltage waveforms of all input connections (IN) of the corresponding group are cophasal with a 50% pulse ratio.

* * * * *